LOCKOUT ARRANGEMENTS FOR PREVENTING OUTGOING TELEPHONE CALLS WHILE PERMITTING INCOMING CALLS

Filed Dec. 14, 1966 2 Sheets-Sheet 1

INVENTOR
A. E. JOEL, JR.
BY H. L. Logan
ATTORNEY

United States Patent Office 3,496,310
Patented Feb. 17, 1970

3,496,310
LOCKOUT ARRANGEMENTS FOR PREVENTING OUTGOING TELEPHONE CALLS WHILE PERMITTING INCOMING CALLS

Amos E. Joel, Jr., South Orange, N.J., assignor to Bell Telephone Laboratories, Incorporated, Murray Hill, N.J., a corporation of New York Filed Dec. 14, 1966, Ser. No. 601,579
Int. Cl. H04m *1/66*
U.S. Cl. 179—189 9 Claims

ABSTRACT OF THE DISCLOSURE

A normally disabled transmission path is connected in series with a lead-in conductor of a telephone at a point where its ringer is not disabled. A rectifying circuit connected to the ringer causes the path to be enabled for the duration of a ringing signal. When answered prior to termination of the ringing signal, conduction through the path causes the path to lock in its enabled state for the duration of the call. Outgoing calls are thus prevented while incoming calls may be received. A key-operated switch is provided to permit outgoing calls to be made.

Figure 1:
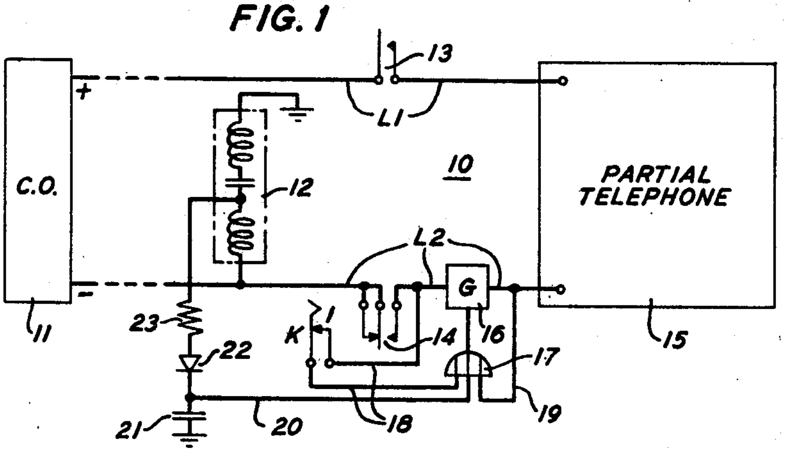

This invention relates to preventing unauthorized use of telephones.

A commercially available lock may be inserted in the "1" hole of a rotary dial telephone to discourage outgoing calls while still permitting incoming calls to be received. Although a similar device is not available for a push button telephone (as, for example, the Touch-Tone® telephone), a key-operated switch could be installed for disabling the telephone's dialing circuitry when desired. It should be noted, however, that with either of these two schemes, outgoing calls may still be made by careful manipulation of the telephone switchhooks. Devices to prevent such manipulations are available but unfortunately are cumbersome and/or prevent reception of incoming phone calls.

An object of the present invention is to prevent unauthorized outgoing telephone calls while permitting incoming calls to be received.

This and other objects of the invention are achieved by providing a telephone with a circuit which may be key operated to disable the entire telephone with the exception of its ringer. When so disabled, outgoing calls cannot be made. For incoming calls, the telephone is enabled in response to ringing and, furthermore, is held enabled when it is answered before ringing ceases. When the incoming call is terminated, the telephone reverts to its disabled state. The telephone may thus be used for incoming calls while preventing outgoing calls.

In several embodiments of the invention, a normally disabled transmission path is connected in series with one of the telephone's lead-in conductors at a point where its ringer is not disabled. A key-operated switch is also provided to selectively render ineffective the normally disabled path so that outgoing calls may be made. When the disabled path is effective, however, outgoing calls may not be made because of the disconnected state of the telephone. Incoming calls, on the other hand, may be received. In particular, under this condition of operation a rectifying circuit connected to the ringer causes the path to be enabled for the duration of the ringing signal. When the telephone is answered prior to termination of the ringing, conduction through the path causes the path to lock in its enabled state. Termination of the call terminates conduction through the path and the path reverts to its disabled state. Outgoing calls are thus prevented while incoming calls may be received.

Other objects and features of the invention will become apparent from a study of the following detailed descriptions of a number of specific embodiments.

Figure 4:
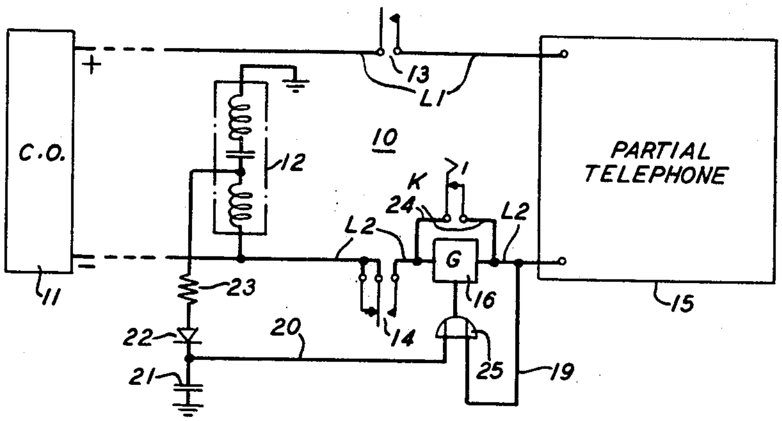
Figure 5:
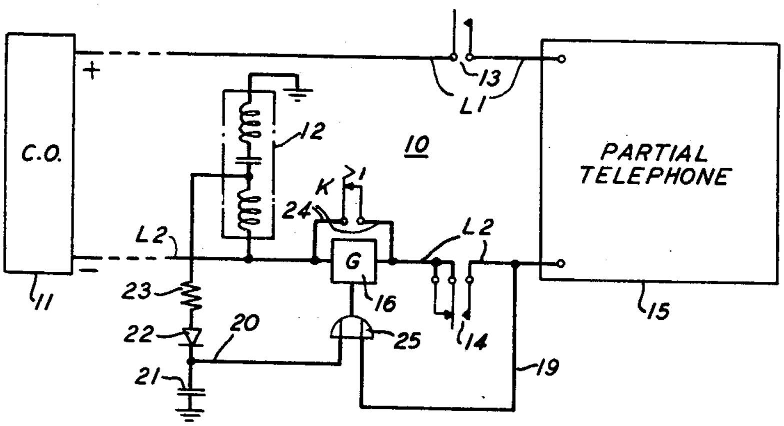
Figure 6:
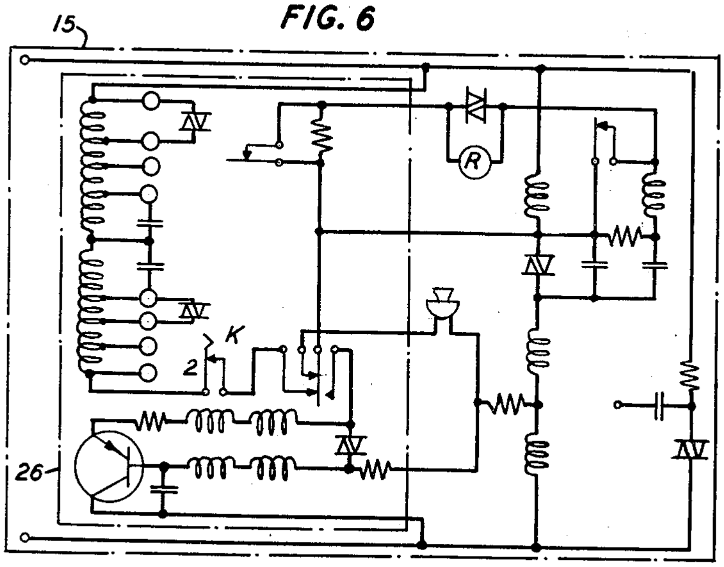

In the drawings:

FIGS. 1 through 5 are schematic drawings of specific embodiments of the invention; and FIG. 6 is a schematic drawing of a portion of a Touch-Tone® telephone.

FIG. 1 shows a subscriber's telephone circuit 10 connected to a central office 11 by way of a pair of lead-in conductors L1 and L2. Circuit 10 includes a conventional telephone comprising a ringer 12 connected between conductor L2 and ground and, furthermore, a pair of switchhook contacts 13 and 14 connected in series with conductors L1 and L2, respectively. The remainder of the telephone is shown as partial telephone 15. This telephone may be of the type that has either rotary or push button dialing. The remainder of the elements in circuit 10 cooperate to selectively disable the telephone for outgoing calls. These elements and the manner in which they cooperate with the telephone are now discussed in detail.

A normally disabled transmission gate 16 is connected in conductor L2 between switchhook contacts 14 and partial telephone 15. An enabling input for this gate is derived from an OR gate 17. One input to the OR gate is connected to the portion of conductor L2 between switchhook contacts 14 and transmission gate 16 by a lead 18 having key operable contacts K1 connected in series therewith. A second input to the OR gate is connected to the portion of conductor L2 between transmission gate 16 and partial telephone 15 by a lead 19. Finally, a third input is connected by a lead 20 to a capacitor 21. When ringer 12 rings, capacitor 21 accumulates a charge by way of a diode 22 and a resistor 23 connected to the ringer.

When outgoing calls are permitted contacts K1 are placed in a closed or enabling state by a key. Under these conditions, removal of the telephone's handset from its cradle causes a negative voltage from central office 11 to be applied by way of conductor L2, contacts 14 and K1, and lead 18 to OR gate 17. This voltage causes the OR gate to apply an enabling voltage to transmission gate 16. When gate 16 conducts, the negative voltage on conductor L2 is also applied to OR gate 17 by lead 19; this second input does not, of course, affect the OR gate output. An outgoing call may now be made in the conventional manner.

For incoming calls, a portion of the ringing signal is rectified by diode 22 to develop a voltage across capacitor 21. This voltage is applied by lead 20 to OR gate 17, which, in turn, applies an enabling voltage to transmission gate 16. When the telephone's handset is removed, switchhook contacts 14 are closed, gate 16 conducts and the negative voltage on conductor L2 is applied to OR gate 17 by leads 18 and 19. At this time ringing stops but the OR gate output is unaffected because the negative voltage applied thereto by either of leads 18 and 19 is sufficient to cause OR gate 17 to produce an enabling output. The receiving party may now talk with the calling party.

It may be noted at this point that when contacts K1 are closed, inputs to OR gate 17 by leads 19 and 20 are unnecessary. In particular, the negative voltage applied by way of lead 18, when the telephone's handset is removed, is sufficient to enable and hold enabled transmission gate 16. The purpose of these additional inputs to OR gate 17 will become apparent from the following discussion of the operation of subscriber circuit 10 when outgoing calls are prevented.

When key-operated contacts K1 are open or disabled, outgoing calls are prevented while incoming calls may be received. Assume, for example, that someone wishes to make an outgoing call when contacts K1 are open. Under these conditions, removal of the telephone's handset closes contacts 14, but OR gate 17 fails to receive the negative voltage from conductor L2. Furthermore, it is impossible for voltages to appear on either lead 19 or lead 20 to cause OR gate 17 to enable gate 16. As gate 16 remains disabled, partial telephone 15 (which includes dialing apparatus and the telephone's handset) remains disconnected from central office 11. Outgoing calls are thus prevented.

Incoming calls, however, may be received when key-operated switch K1 is open. As described previously, received ringing signals are rectified by diode 22 to produce a voltage across capacitor 21. This voltage causes OR gate 17 to enable transmission gate 16. When the telephone's handset is removed before ringing terminates, gate 16 conducts and the negative voltage on conductor L2 is applied to OR gate 17 by way of gate 16 and lead 19. This locks gate 16 in an enabled state for the duration of the call. When the handset is replaced, switchhook 14 is opened and gate 16 is disabled and cannot be enabled unless another incoming call is made.

The embodiments of the invention shown in FIGS. 2 through 5 are similar to that of FIG. 1 and consequently the same symbols have been used to identify the elements of the embodiments.

Figure 2:
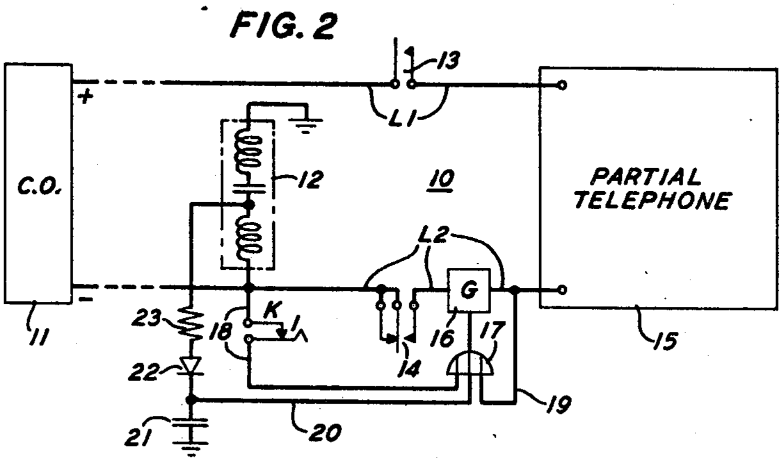

The only difference between the eembodiment of FIG. 2 and that of FIG. 1 is that lead 18 is connected to the opposite side of switchhook contacts 14. The operation is the same as that of FIG. 1 with the exception that gate 16 is always enabled when switch-operated contacts K1 are closed. Since this causes a current drain when the telephone is not in use, the embodiment of FIG. 1, which does not cause such a drain, may be preferred in some applications.

Figure 3:
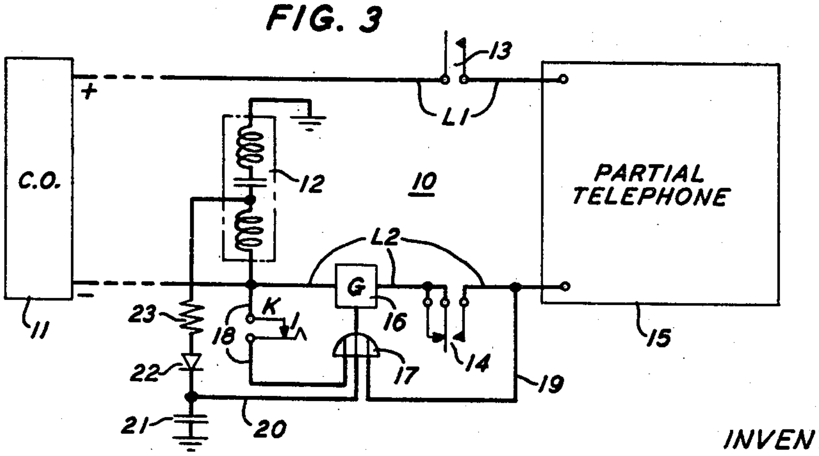

The embodiment of FIG. 3 differs from that of FIG. 2 in that gate 16 has also been moved to the other side of switchhook contacts 14. The operation of this embodiment is identical to that of FIG. 2.

The only differences between the embodiment of FIG. 4 and that of FIG. 1 are (1) the elimination of lead 18 with contacts K1, (2) the shunting of transmission gate 16 with a lead 24 having contacts K1 in series therewith and (3) the replacement of three-input OR gate 17 with a two-input OR gate 25.

When key-operated contacts K1 of FIG. 4 are closed, the telephone is in its normally connected condition and outgoing calls may be made while incoming calls may be received. (As a matter of interest, OR gate 25 enables transmission gate 16 when the telephone's handset is removed from its cradle or ringing occurs; the gate is again disabled when the handset is replaced or ringing ceases. None of this action, however, affects the normal use of the telephone.)

When key-operated contacts K1 of FIG. 4 are open, outgoing calls may not be made because conductor L2 remains broken even though contacts 14 are closed when the telephone's handset is removed from its cradle. Ringing produced by an incoming call, however, causes OR gate 25 to enable transmission gate 16. As in the operation of the prior discussed embodiments, removal of the handset from its cradle before ringing ceases produces a voltage on lead 19 which, in turn, causes OR gate 25 to maintain an enabling voltage on transmission gate 16. This lock-up condition continues until the handset is returned to its cradle. The present embodiment therefore functions as the previously described embodiments in that the opening or breaking of key-operated contacts K1 prohibits outgoing calls while still permitting incoming calls to be received.

The embodiment of FIG. 5 differs from that of FIG. 4 in that transmission gate 16 and shunting lead 24 have been moved to the other side of contacts 14. The operation of this embodiment is identical to that of FIG. 4.

In most present day telephone applications, any one of the above-described embodiments will prohibit outgoing calls, either by dialing of switchhook manipulations, when key-operated contacts K1 are open. An exception to this prohibition occurs when a telephone is being used for a conference call; that is, when more than two telephones are interconnected as a result of dialing. In particular, when a telephone is actually being used for a conference call, an outgoing call to bring another party into the conference may be dialed and completed even though key-operated switch K1 is in its disabling state. This problem is solved in accordance with another aspect of the present invention by disabling the dialing circuit of a telephone at the same time contacts K1 are opened. In particular, a second set of contacts are provided on the key operated switch and these contacts are wired into the telephone so that its dialing apparatus is disabled at the same time contacts K1 are opened. Although outgoing calls during conference calls may still be made by switchhook manipulations, conventional dialing calls are prevented. The placement of this second set of contacts in a conventional Touch-Tone® telephone is now briefly discussed.

The portion of a Touch-Tone® telephone that may be present in partial telephone 15 is shown in schematic diagram form in FIG. 6. A detailed discussion of this telephone is presented in an article entitled "A Touch-Tone Caller for Station Sets," authorized by Messrs. J. H. Ham and F. West and published beginning on page 17 of the March 1963, issue of the IEEE Transactions on Communication and Electronics. In FIG. 6, the multifrequency oscillator used for dialing has been enclosed by a series of broken lines and identified by the symbol 26. The second set of contacts referred to in the previous paragraph are shown in series with one of the tuned circuit leads of oscillator 26 and are identified by the symbol K2. These contacts are key operated along with contacts K1. When they are open, the oscillator cannot oscillate, which, in turn, prohibits outgoing calls.

Although several embodiments of the invention have been discussed in detail, various other embodiments may be devised by those skilled in the art without departing from the spirit and scope of the invention.

What is claimed is:

1. In combination with a subscriber's telephone having a pair of lead-in conductors, a telephone ringer connected to at least one of said lead-in conductors and switchhook contacts in series with said conductors, respectively, a control network comprising, a normally disabled transmission means connected in series with one of said lead-in conductors so that said ringer is not disabled, said transmission means comprising a normally disabled transmission gate having an enabling input terminal and an OR gate having an output terminal connected to said enabling input terminal and at least two input terminals where one of said input terminals is connected to said lead-out conductor in which said means is located to maintain said means enabled, when once enabled, for the duration of conduction through said means, and means connected between said ringer and the other of said OR gate input terminals to enable said transmission means when said ringer is operated, and key-operated switch means operable to render electrically continuous said conductor in which said transmission means is located when said switchhook contacts are closed.

2. A combination in accordance with claim 1 in which said means connected between said ringer and said other OR gate input terminal comprises a rectifier and a filter circuit connected in series therewith.

3. A combination in accordance with claim 2 in which said key-operated switch means comprises a key-operated switch connected in shunt with said transmission means.

4. A combination in accordance with claim 2 in which said key-operated switch means comprises a key-operated switch connected to one of said OR gate inputs to selectively apply an enabling potential thereto.

5. In combination with a subscriber's telephone having a pair of lead-in conductors, a telephone ringer connected to at least one of said lead-in conductors and switchhook contacts in series with said conductors, respectively, a control network comprising, a normally disabled transmission gate having its transmission path connected in series with one of said lead-in conductors so that said ringer is not disabled and, furthermore, having an enabling input terminal, an OR gate having at least two input terminals and an output terminal where said output terminal is connected to said gate enabling input terminal, a rectifying circuit connected between said ringer and one of said OR gate input terminals, conductive means connecting another of said OR gate input terminals to said lead-in conductor in which said gate is connected, and key-operated switch means operable to render electrically continuous said conductor in which said gate is located when said switchhook contacts are closed.

6. A combination in accordance with claim 5 in which said key operated switch means comprises a key-operated switch connected in shunt with said path.

7. A combination in accordance with claim 5 in which said key-operated switch means comprises a key-operated switch connected to one of said OR gate inputs to selectively apply an enabling potential thereto.

8. A combination in accordance with claim 6 in which said key-operated switch means further comprises a key-operated switch connected in said dialing circuit to disable said dialing circuit when the first-mentioned key-operated switch is disabled.

9. A combination in accordance with claim 7 in which said key-operated switch means further comprises a key-operated switch connected in said dialing circuit to disable said dialing circuit when the first-mentioned key-operated switch is diasabled.

References Cited

UNITED STATES PATENTS 1,812,984 7/1931 Richey ------------- 179—81

KATHLEEN H. CLAFFY, Primary Examiner

WILLIAM A. HELVESTINE, Assistant Examiner